US007240878B2

(12) United States Patent
Towne

(10) Patent No.: US 7,240,878 B2
(45) Date of Patent: *Jul. 10, 2007

(54) HIGH WING MONOPLANE AEROSPACE PLANE BASED FIGHTER

(76) Inventor: Andrew James Towne, 17 Penrose Blvd., Colorado Springs, CO (US) 80906

(*) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 08/999,657

(22) Filed: Sep. 2, 1997

(65) Prior Publication Data

US 2005/0230529 A1    Oct. 20, 2005

Related U.S. Application Data

(63) Continuation-in-part of application No. 08/692,061, filed on May 13, 1996, now abandoned.

(51) Int. Cl.
*B64G 1/10* (2006.01)
(52) U.S. Cl. .............. 244/159.3; 244/171.3; 244/171.4; 244/13; 244/119
(58) Field of Classification Search .......... 244/45 A, 244/13, 2, 159.3, 171.3, 171.4, 117 R, 119
See application file for complete search history.

(56) References Cited

U.S. PATENT DOCUMENTS 3,942,746 A * 3/1976 Carter et al. .................. 244/13
3,955,781 A * 5/1976 Tupolev et al. ............... 244/13
4,802,639 A * 2/1989 Hardy et al. .................. 244/2
4,896,846 A * 1/1990 Strom ....................... 244/45 A
5,082,206 A * 1/1992 Kutschenreuter, Jr. et al. .. 244/53 B
5,150,858 A * 9/1992 Hopwell et al. .......... 244/45 A
5,526,999 A * 6/1996 Meston ........................... 244/2
5,542,625 A * 8/1996 Burhans, Jr. et al. ..... 244/45 A
5,842,666 A * 12/1998 Gerhardt et al. .......... 244/45 A
6,119,985 A * 9/2000 Clapp et al. ................. 244/172

\* cited by examiner

*Primary Examiner*—J. Woodrow Eldred
(74) *Attorney, Agent, or Firm*—Richard W. Hanes

(57) ABSTRACT

The Hypersonic Orbital Fighter and the methods of flying it are disclosed. The Hypersonic Orbital Fighter is characterized by a winged, modified lifting body shape with the forward ventral section comprising an X-30 type compressive air inlet, throttleable supersonic combustion ramjet array under the center of gravity and half-cone exhaust outlet at the back, fore mounted canards, cockpit/payload area top front and mid section and one or more tailplanes at the top back. Flight profile comprising runway takeoff, high subsonic climb up to 65,000 feet, alternatively full power climb from zero to 65,000 feet, with progressive acceleration from there up to Mach 24 @ required orbital altitude. Able to intercept missiles from early through post-boost phase from chosen orbit or suborbital arc, to intercept aircraft and to interdict surface targets. Winged dynamic soaring capability in reentry followed by powered runway landing.

5 Claims, 6 Drawing Sheets

FIG. 1
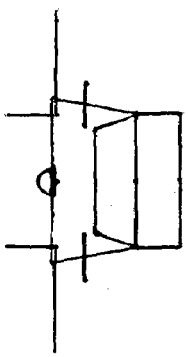
FIG. 2
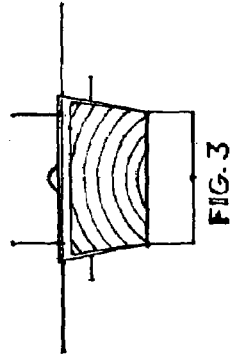
FIG. 3
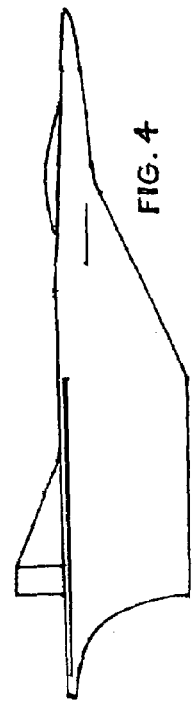
FIG. 4
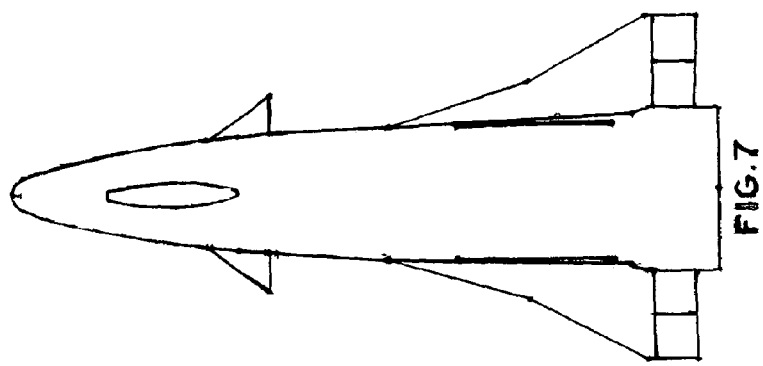
FIG. 7 FIG. 5
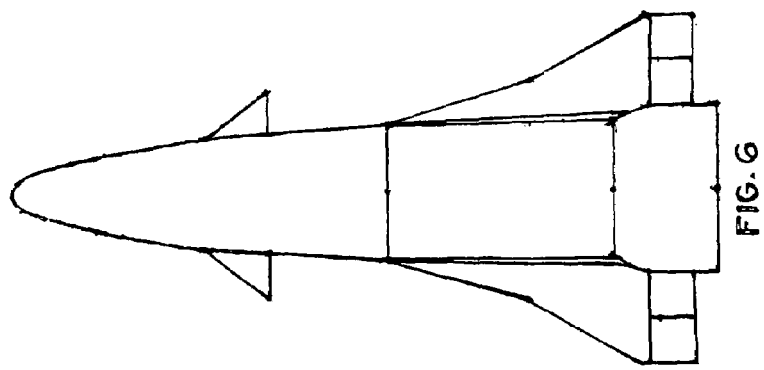
FIG. 6

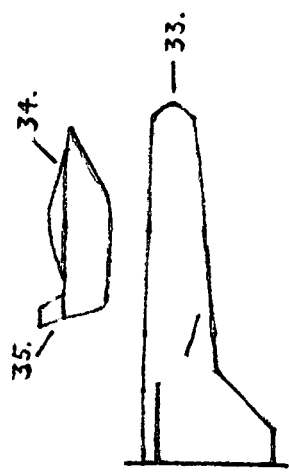
Fig. 34
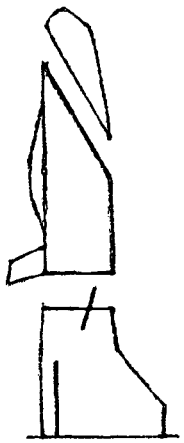
Fig. 35
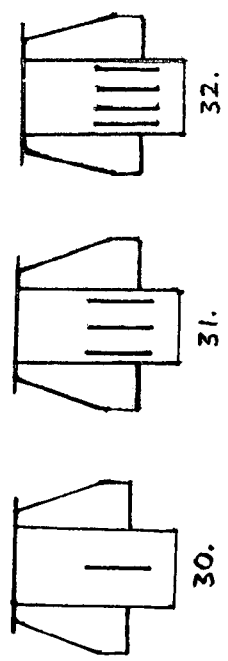
Fig. 33
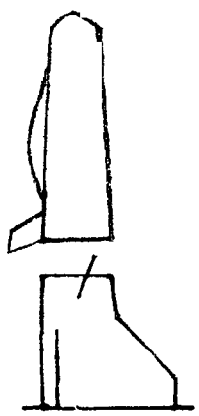

HIGH WING MONOPLANE AEROSPACE PLANE BASED FIGHTER

CROSS-REFERENCE TO RELATED APPLICATION

This application is a continuation-in-part of U.S. patent application Ser. No. 08/692,061, filed May 13, 1996, abandoned concurrently with the filing of this application.

BACKGROUND OF THE INVENTION

1. Field of the Invention

The Invention relates to the field of aero/astronautics, specifically to the design and use of small spaceplanes from 50,000 up to 300,000 lbs. Gross Takeoff Weight, hereinafter referred to as GTW.

2. Brief Description of the Related Art

Until the present, access to suborbital and orbital flight has been limited to vertically launched or ascendant, generally unaerodynamically assisted rockets experiencing structural consumption or requiring extensive refit to repeat, lofting payloads at a $10,000/lb. cost. By employing low cost, routine runway takeoffs and powered landings, the efficiencies of hydrogen propulsion or simply of reusable-throttleable supersonic combustion ramjets, aerodynamic lift, reusable reentry ablatives and a titanium aluminide airframe ready for further flight upon return, even small spaceplanes can drop the cost per pound to suborbit and orbit an order of magnitude to under $1000 a pound. Further, this flight efficiency makes it possible to increase the military utility of spaceflight by dropping the cost and greatly increasing the flight reliability and probability of military payload flight placement and replacement, as well as opening suborbit and orbit to routine military (air) superiority flight and patrol.

Since the time efficient weapons were mounted in aircraft, the design of the pursuit/fighter type has been a search for the highest performance obtainable coupled with a predictable reliability. Despite the flight and program cancellations of the X-15B, the X-20 and the X-30 FIG. 1, with what these programs found and Space Shuttle flight the thread of design progress is able to continue to this day and now stands where a fighter type can be usefully derived from the X-30 titanium aluminide airframe winged lifting body, with air-compressing intake fore and half-cone exhaust aft, featuring mid-mounted supersonic combustion ramjets that burn JP-8 or better now and hydrogen and 50% solids slush hydrogen, in time. Because aerospace planes are large due to propulsion requirements, the fighter type necessarily goes from less than the fighter's current large 65,000 lbs. GTW to the start of the X-30's 300,000–1,000,000+GTW range. The X-30 design covered 1,000,000 to 300,000 lbs in the course of demonstrating cost effective cargo transport. Fighters have been found most effective as the smaller of the ascending classes of aircraft over time. In this weight range cargo carriage is possible and commercial flight thrives best using flight technologies formed by military usage, but unit costs go up as size decreases and the most cost effective carriage over suborbital long range or into orbit will always be found in the X-30's 300,000 to over 1,000,000 lb. GTW range.

SUMMARY OF THE INVENTION

The present invention is a new aircraft type and therefore requires a range of design parameters to allow the designer specific application to the various requirements of sub-types: fighter, attack, science, observation and reconnaissance, utility (special function, cargo and personnel), trainer and suborbital variants of these. It applies the body of spaceplane technologies to weight classes not included in their development. Additional features for fighter use include an actively cooled ceramic nose, canted forward and beveled forward cockpit bulkhead with active cooling in case the nose comes off etc., canard foreplanes and other aerodynamic devices, active fuel tank, system and airframe fire suppression, extra strengthening, gravity-drop-down-and-lock landing gear and effective means of crew escape together with correct size and its more easily improved power-to-weight ratio. Weight is saved and the art advanced by causing the titanium aluminide forging and extrusion press weights to approach and then exceed the Convair F-102 series production standard. Structural and systems redundancy is introduced as a primary element of spaceplane flight safety. Military utility is provided in missile interception, asteroid interception, satellite interception, military satellite delivery, placement, and retrieval, reconnaissance, communications relay, aircraft interception and surface interdiction. Military payloads deployed from top mid fuselage bay and hardpoints and underwing fuselage bays, and before reentry, from underwing and fuselage hardpoints. Air superiority is best maintained by computer assisted, briefed and trained pilots at all altitudes. For missile defense, manned counter-air spaceplanes are the cover element of the traditional air umbrella that requires area and point terminal defenses in place of the traditional anti-aircraft guns, when it leaks. Civil types for satellite carriage, placement and retrieval, science, signal relay, carriage of cargo and personnel. Self-launched unmanned types, or types launched by manned vehicles have orbital and suborbital applications from attack, patrol, reconnaissance, and utility to training and science. All variants are maintainable on the ground.

BRIEF DESCRIPTION OF THE DRAWINGS

FIG. 1 is a view of the X-30 National AeroSpace Plane.

FIG. 2 is a front elevational view of the Hypersonic Orbital Fighter of the present invention. All views of the invention show level flight.

FIG. 3 is a back elevational view of the embodiment of FIG. 2.

FIG. 4 is a right-side elevational view of the embodiment of FIG. 2.

FIG. 5 is a left-side elevational view of the embodiment of FIG. 2.

FIG. 6 is a bottom plan view of the embodiment of FIG. 2.

FIG. 7 is a top plan view of the embodiment of FIG. 2.

FIG. 33 is a top plan view of one, three and four tail elements.

FIG. 34 is a right side elevational view of a separable cockpit bulkhead mounted crew rescue vehicle at separation.

FIG. 35 is a right side elevational view of a separable forward fuselage modified as an aerodynamic crew rescue vehicle at separation.

DETAILED DESCRIPTION OF THE PREFERRED EMBODIMENT

The present invention advances the art and is practical due to its materials and configuration. The primary material is titanium aluminide, referred to hereafter as TiAl that is for the first time in its development history systematically forged and extruded toward the F-102 50,000 ton for forgings and 12,000 ton extrusion press weight baselines for duralumin established while developing the first production supersonic interceptor. These materials improve weights and operating costs and payloads go up dramatically as a portion of GTW, producing order of magnitude improvements in performance and payload cost per pound, as demonstrated by modern fighters to Mach 2.7 and the advent of commercial jet transport. Approaching and exceeding the prior press weight benchmarks utilizing TiAl makes flight from Mach 3.5 to orbit and beyond, cost effective and practical. Improved thermal efficiency through compacted metallic structures facilitates approach to design thermal limits of 2500–4000 degrees F. Use of preexisting software, componentry and parts is encouraged except where significant performance is gained by original fabrication.

Figure 9:
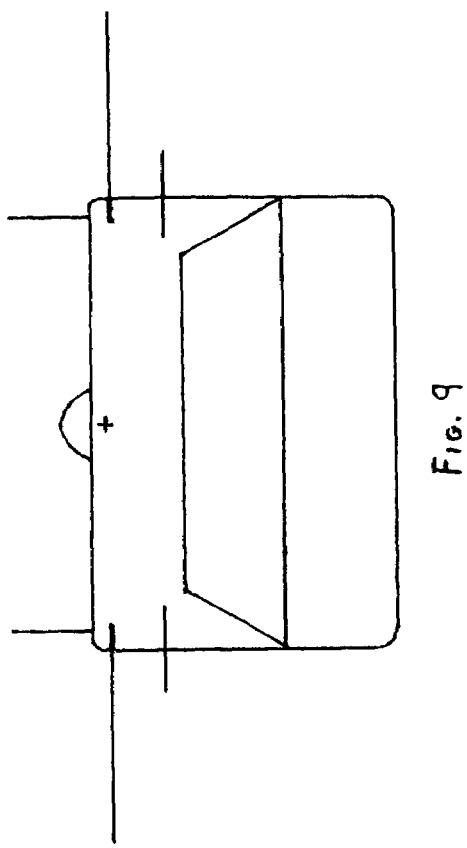
FIG. 9 is a front elevational view of the fuselage cross section at 1.5:1.
Figure 8:
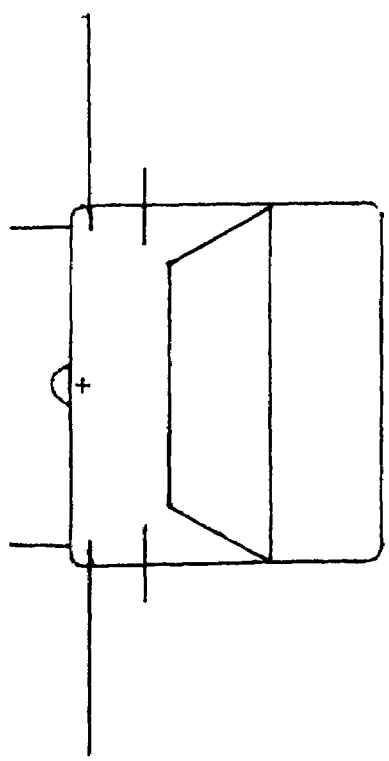
FIG. 8 is a front elevational view of the fuselage cross section at 1.1:1.
Figure 23:
FIG. 23 is a right side elevational view of a jet spaceplane in a conventional non-canard configuration.

The best configuration for the type utilizes canard wings FIG. 7 and a frontal fuselage cross section from a 1.1:1 width-to-height ratio FIG. 8 to 1.5:1 FIG. 9, close to square. A canard configuration provides a single solution to issues of ponderous handling in lifting bodies and spaceplanes including low speed flight in terminal areas, high subsonic control, nose high-and-low tendency during passage into or through high speed regimes, center of gravity, hereinafter referred to as cg, travel during flight and aerodynamic instability appropriate to a fighter type, hereinafter referred to as fighter or type instability. A standard configuration FIG. 23 can be appropriate for simpler applications like drones, trainers and lightweight fighters. A frontal cross section close to square is chosen as an improvement for type over the McDonnell Douglas X-30 rectangle, appropriate for transports and bombers, and the General Dynamics square, appropriate for applications of more limited speed, range and payload. The near-square improves pitch, yaw and roll moment for type, while giving more room than the X-30 square for ventral forebody compression of engine inlet air, and payloads, fuel and equipment in a dense structure. The preferred embodiment is constructed with quintuple structural redundancy with five load paths for everything, and double or, alternatively, triple systems redundancy as a baseline for high speed and altitude flight safety.

Figure 14:
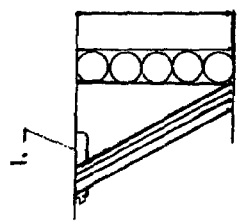
FIG. 14 is a left side sectional view of actively cooled titanium aluminide inner airframe shielding on spar front.
Figure 15:
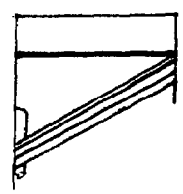
FIG. 15 is a left side sectional view of uncooled titanium aluminide inner airframe shielding on spar front.
Figure 12:
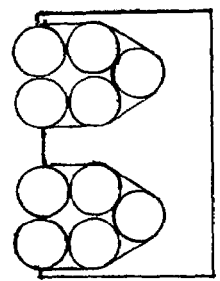
FIG. 12 is a side sectional view of alternative cooling line stacking between inner skin extrusions.
Figure 13:
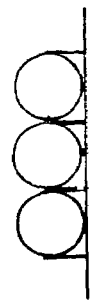
FIG. 13 is a side sectional of active cooling line placement between titanium aluminide cooling fins.
Figure 10:
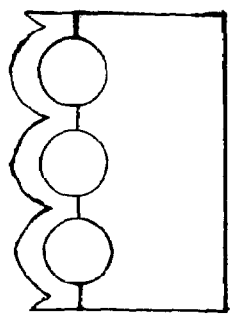
FIG. 10 is a front sectional view of active cooling line placement between inner skin extrusions with protective carbon/carbon blanket.
Figure 11:
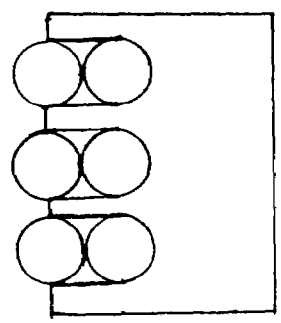
FIG. 11 is a side sectional view of active cooling line stacking between inner skin extrusions.

The foreplanes in the preferred embodiment have a minimum sweep of 55 degrees FIG. 7 to limit thermal and aerodynamic loads while damping configuration pitch instability. Thermal transfer is enhanced by placing of active cooling lines between extrusions on inner skin FIG. 10 and stacking lines between extrusions, coverable with a carbon/carbon blanket to preserve cooling function and structural integrity when foreplane is damaged and under structural heating FIG. 10, FIG. 11, FIG. 12, alternatively TiAl cooling fins FIG. 13. Skin extrusions can serve as stringers. Aerodynamic loads are spread using three or more spars. First spar comprises leading edge and is 1.5 to 2 times as strong as other spars. Exemplary embodiment of inner spar front cooling with lines behind a TiAl shield including softer to harder carbon/carbon ablative FIG. 14 to preserve cooling function and structural integrity when foreplane is damaged and under structural heating. Exemplary embodiment of spar shielding without active cooling FIG. 15. Wing cavities supplied with ambient temperature effective low to high rate fire suppression system fed from central fuselage supply. Alternative supply from local reservoirs. Preferred fire suppressant is halon, alternatively nitrogen or carbon dioxide. Fire suppression lines, hydraulic system lines for articulated foreplanes and electrical lines routed behind spars. Hydraulic articulation of ailerons, flaperons, split and single, double and triple Fowler flaps, and spoilers. Trim tabs utilize electric actuation. Trim tabs are of sufficient size to provide aerodynamic control effect in case of complete hydraulic failure.

Figure 16:
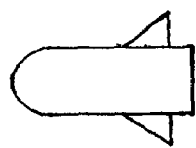
FIG. 16 is a top plan view of small canard foreplanes.
Figure 17:
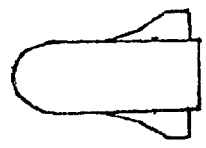
FIG. 17 is a top plan view of canard foreplanes modified with a leading edge crank.
Figure 18:
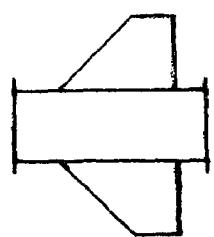
FIG. 18 is a top plan view of medium hypersonic wings with 45 degree sweep.
Figure 19:
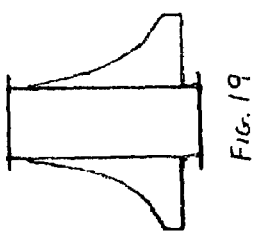
FIG. 19 is a top plan view of medium hypersonic wings with curving sweep down to 30 degrees.

Fighter instability in the pitch axis is controlled by changing the size and shape of the canard FIG. 16, FIG. 17 and by varying fuselage width to increase or damp pitch moment FIG. 8, FIG. 9. Larger canards tend to be more stable at low speeds and less stable above them, smaller canards are the other way around. Foreplanes and wings generate less angle of attack on takeoff and landing by clipping pure delta wingtips or cranking leading edges FIG. 17. Maintenance access from top. Larger foreplanes provide more area for tankage and upward looking radar, IR, optical and ELINT arrays. Smaller foreplanes provide less stowage area and require ablative on both sides at below 10% of main wing area to shield control excursions under heating without elevon assist. Ablatives are of one piece carbon/carbon as preferred embodiment due to tile interstices being cause of much breakage and large number of machining and installation operations required for tile ablatives, versus increasing availability of precision autoclave products from competing sources. Alternatively tile ablatives. Artificial sapphire, ceramic or high carbon plastic electronic apertures. Coolant timed in pulses to array operation, freon-cooled air for optical apertures. Thickness to chord ratio of 3–4%. Alternatively, increase for more stability and internal capacity. Alternative wing shapes for high speed loiter under Mach 14 or drone or precision ballistic object with maximum aerodynamic authority are 45 degree sweep with clipped wing tip FIG. 18 and curving radius leading edge to 30 degree sweep FIG. 19.

Figure 20:
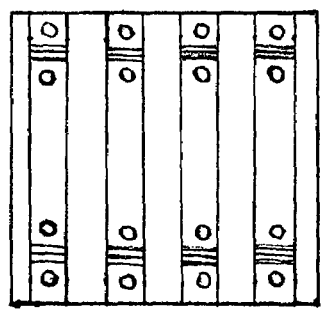
FIG. 20 is a top plan view of a removable section active cooling grid.
Figure 21:
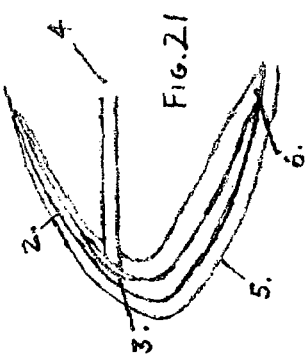
FIG. 21 is a side plan view of a retracted slat and extension arm.

Main wings of similar construction. The preferred embodiment of the main wings is a sharp inboard sweep at or over 70 degrees inboard and 60 degrees outboard FIG. 7 with three main spars, tapering toward wing tip and with back of third spar serving as attachment point for elevons and flaperons. Maintainability in improved by a system of active cooling line taps and quick releases under removable panels to facilitate access into dense structures FIG. 20. Reaction control points at wingtips to $1/3$ distance to fuselage to facilitate external carriage. External carriage at wingtips to be dispensed before reentry, carriage above wings returnable with shielding integral to carried objects. Payload and propulsion pylon mounted carriage facilitates shockwave management and boundary layer control as demonstrated in supersonic dives by the Douglas DC-8. Thermalization of of flight control interfaces as first shown by STS-28 thermal imaging requires gap tolerances to just short of expansion limits. Slats FIG. 21 are for STOL and nautical applications and require drilling slat extension arm holes in the front spar. If the slat comes off under aerodynamic loading the part fails in front of the backing plate on the extension arm. Behind the backing plate the hole is sealed by the tight tolerance between the arm and the hole opening, where the back of the slat 2. meets the backing plate 3. on the front of the extension arm 4, covering the hole under aerodynamic load, with outer 5. and inner 6. ablative. Slat cooled by heat transfer to actively cooled front spar, alternatively by dedicated active cooling. Ruggedized structures for drone and ballistic high G maneuvering start crowding components out of the structure above 24 G's. Alternative wing shapes as for the foreplanes.

Figure 22:
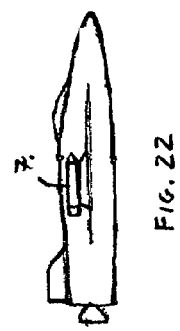
FIG. 22 is a right side elevational view of a rocket spaceplane.

The preferred embodiment of the main wing is a thickness to chord ratio of 2.5–3.5% outboard, to 4.5% inboard. Alternatively, to increase for more stability and capacity, to decrease or shrink or clip the wings to induce fighter instability in the pitch and roll axes, and to enlarge the wings and move them forward if not utilizing canards for rocket propulsion FIG. 22 and supersonic combustion FIG. 23. The lift ratio for wing:fuselage:wing of 1:2:1 to 1:10:1 introduces more inherent tolerance for missing wing area through reentry and down. Ratio to be biased toward wings for improvement in atmospheric maneuvering and handling.

The fuselage of the preferred embodiment is of similar construction to the wings, with active cooling on the frame fronts and tops, bottoms and inside edges of longerons and stringers with similar internal shielding to wings, and systems routed behind frames and on tops and bottoms of longerons and stringers, away from reentry forces should the fuselage be damaged. Armor of kevlar blankets, and FIG. 24 with backings of thin to thick section TiAl 8, duralumin 9, titanium 10, steel 11, meshes from $1/64$ to one inch 12, with nylon 13. or plexiglass 14. polymers with heavy, ferrous or precious metals diffused through them and reflective surfaces 15. to deflect EMF and cosmic radiations, micrometeorites, meteorites, shot, shell, military jetsam and space debris from vital components, systems and areas. Embedded and diffused heavy, ferrous and precious metals in the armor polymers provide additional ballistic and EMF protection.

Figure 25:
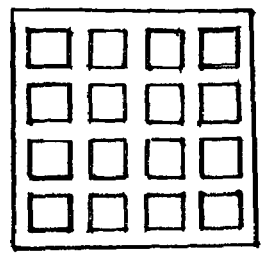
FIG. 25 is a top sectional view of celled fuel stowage.

Tankage is subdivided into cells FIG. 25 small enough for explosion of medium plus high pressure fire suppressant intrusion to be contained by strength of cell walls while venting up and out. This type of venting is hereinafter referred to as passive vents. Maximum cell size using high strength TiAl, titanium or steel forgings up to 0.25 inches square at a 15 foot height of the upper fuselage using $1/10$ to $1/4$ of the area for cell walls, depending on the material. The high rate fire suppression is optically triggered. Material is collected from the top or bottom by a line array. Line is fire suppressed and vented every six inches in a similar way with fire suppression nozzles and triggers 16. and vents 17.

Figure 27:
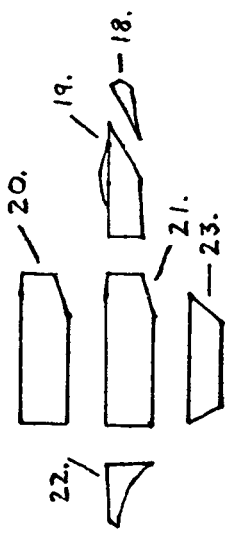
FIG. 27 is a right side exploded view showing major fuselage subassemblies.
Figure 26:
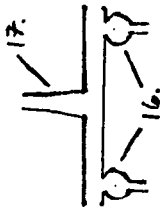
FIG. 26 is a side elevational view of fire suppressed fuel line.

Fabricated in five sections FIG. 27, ceramic nose 18, cockpit 19, right 20. and left 21. center sections, back 22. and ventral engine compartment 23. to facilitate finishing and assembly. Reusable ceramic nosecone has cast in, drilled in and added ceramic passages for active cooling with cooling turned off or timed in pulses during forward looking array operation. Array is mounted on meltable duralumin lattice mounted on cockpit firewall. Firewall is canted 60 degrees forward and beveled in the middle, fully ablated and actively cooled and made a strong structure backed monocoque comprising forward armor and pressure vessel while allowing post-impact and lesser-collision reentry as provisional aerodynamic nose.

Structure built around nine main longerons, twelve for air breathing, three upper, one at each corner with central longeron assembled to right upper fuselage half, three middle with central longeron breaking for key internal structures, payload bays and components, three lower with three more defining structural separation between air breathing engine compartment and upper fuselage.

Figure 24:
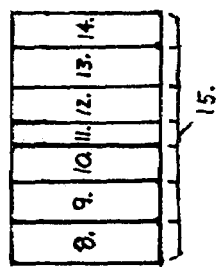
FIG. 24 is a side sectional view of composite armor.

Engine compartment structurally separate from airframe for safety, with efficient fire suppression and effective composite armor FIG. 24 to keep military jetsam out of the upper fuselage and wings. Engine compartment designed to structurally separate from airframe if deceleration forces exceed 8 G's to facilitate upper fuselage deceleration under forced landing and transition to stop. Airbrakes located on fuselage sides above main landing gear doors to within four feet of lower wings and aft of cg.

Payload accommodation and tankage aft of cockpit. Tankage armored in a weight-effective manner with composite armor, thermal blanketed and cooled to requirement. Major components of reaction control, environmental, hydraulic, electrical and refrigeration systems forward, aft and to sides of tankage and payload. Two to three APU's in the back. Effective composite armor all around and below is an integral part of the pressure cell. Bulkhead at rear of cockpit assembly provides mounting points for foreplane pivots.

Figure 29:
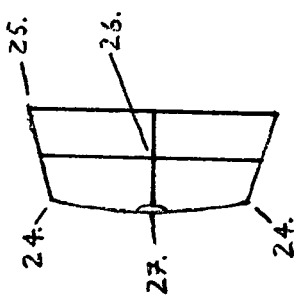
FIG. 29 is a top sectional view of a side-facing weapons bay.

Dorsal weapons bay in mid fuselage forward of empennage and in fuselage sides below wings. Dorsal weapons bay may be contiguous with crew area, also as a cargo or passenger configuration. To forestall some premature pyrotechnic detonation weapons bay walls FIG. 29 are angled in at the concave bottom 24. and out at the top 25, strengthened and subdivided 26. with a spring loaded release that is sensor triggered 27. to release in the first few milliseconds of an event to limit proximity.

The rest of the top fuselage not taken by passive vents is available for hard points and detection devices, arrays mounted under ceramic or high carbon composite panels, cooled like the nosecone, alternatively under actively cooled artificial sapphire, on the sides, along with the side weapon bays. Reaction control points may be put as far back as $1/3$ fuselage length on top, pointing up, and sides, pointing sideways and down, to save weight. Navigation lights are under actively cooled artificial sapphire lenses. Ventral navigation light mounted on rotating base under engine compartment. Both sides of base and interior under base are ablated and actively cooled to keep reentry forces out under mechanical failure.

Figure 30:
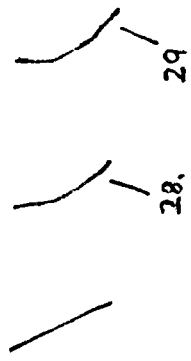
FIG. 30 is a front sectional view of three types of canted-out fuselage sides.
Figure 28:
FIG. 28 is a right side exploded view showing nosecone-less reentry capable forward fuselage.

Active arrays are ahead of or behind and oriented away from the pilot and crew. Ventral hardpoints include provision for one, two, three four or five solid rockets for useful acceleration up through escape velocity. All active vents are behind all air intakes. All passive vents are out of line with or behind all air intakes. Deceleration parachute in top back. The X-30 type actively cooled half-cone and ablatives are strongly structured against sonic fatigue. Back facing arrays are blistered on the dorsal aft fuselage. Fuselage sides can be canted out FIG. 30 under the wings at the top, or alternatively bent 28. or banded 29. to assist radar return distortion. The alternatives can induce instability on all three axes. Curving the fuselage sides from front to back FIG. 31 can do the same. Curving or pinching at the back FIG. 32 can improve airflow access to the propulsion vacuum and thus improve stability and drag.

Figure 31:
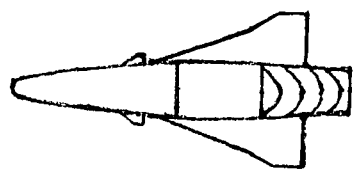
FIG. 31 is a bottom plan view of curved fuselage sides.
Figure 32:
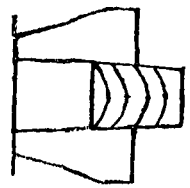
FIG. 32 is a bottom plan view of pinched fuselage sides in the back.

The empennage consists of FIG. 33 one 30, two FIG. 2, three FIGS. 33 31, or four 32. vertical tail elements. Even with the slab side spaceplane profile one element can be unstable on the yaw axis so it requires size vertically or along the chord. It minimizes external dorsal carriage separation issues. It can be blanked by dorsal centerline carriage. Two elements are stable at speed, yaw instability is induced by shrinkage and reduction of the thickness chord ratio below 7%. It has potential for separation issues and can be blanked by right and left dorsal carriage. Three elements are stable at speed with some drag penalty and yaw instability is induced as above. It can be blanked by centerline, right and left external carriage and can have separation issues. Four elements are stable at speed with some drag penalty and yaw instability is induced by shrinkage and reduction of thickness to chord ration to under 6.5%. Only partially blanked by dorsal centerline, right and left external payload carriage, it maximizes payload separation-and-clearance issues. Alternative use with powered all-flying or articulated units on pivots to improve subsonic and other yaw maneuverability. Three or more tail elements may be of different sizes and symmetry.

The landing gear of the preferred embodiment is a rear hinged gravity drop-down-and-lock tricycle or crosswind quad with dual wheels at all points. It is stored under the nose behind the ceramic and alongside the engine compartment. The main gear swings out to a wide ground stance behind the cg while providing, together with the nosegear sufficient ground clearance for center section ventral hard points. Quad bogies at the back for higher weights and speeds, over 185,000 lbs. GTW, and over 185 mph or 165 knots.

The powerplant of the exemplary embodiment is Pratt & Whitney and Rocketdyne celled supersonic combustion ramjet propulsion providing thrust values from 100,000 to over 6 million pounds. This powers the 50,000 to 300,000 lb. GTW range to mission speeds from Mach 3.5 to orbital Mach 24 from a high subsonic start above the ozone layer, or, alternatively from the ground or intermediate altitudes. This embodiment is fueled with slush hydrogen of up to or over 50% solids. Alternative fueling with JP-8 or RP-1 through RP-5. Oxidizer just before high altitude flameout between 175,000 and 235,000 feet. Type propulsion to Mach 33 when perfected for escape velocity applications. Propulsion system employs top mounted inlet door fed and exhausted and boundary layer bled turbines at the front of the engine compartment to get the internal airspeed to the 300–450 knots the supersonic combustion ramjets require to operate. The turbines are powered by electric motors in a stage 1 and 2 manner until propulsion unit fires and stage 3 type drive can take over. Intake blown clear with bleed air. Alternatively retractable turbines. Engine compartment utilizes a one-piece removable carbon/carbon ablated skin piece on bottom with removable cooling grids to facilitate access. Alternative propulsion of conventional rocket, underwing and fuselage expendable and recoverable solid rocket, and overwing turbine power with closing intake apertures. Alternative propulsion by liquid fueled rocket keeps the materials improvements while losing free air oxidizer on the power consumptive ascent, a loss of up to 40 tons in a 200,000 lb. machine, new materials gaining back as much as ten tons. Alternative supplemental propulsion by underwing and fuselage solid rockets require good structural seating and clear exhaust pathways for earlier type suborbital, orbital and escape velocity applications and readily available extra speed. Overwing turbine power with intake apertures closing above Mach 0.9 to 1.3 provides ready access to transonic speed and blown uncooled titanium flaps with drag, weight and thermal penalties, wing interface with shockwave and boundary layer interactions to manage and pendulum and sway moment. They are able to leave the wing without striking the airframe in case of interface design limit overload, catastrophic failure of turbine balance or integrity or fire or military event on the wing.

The accommodation provides authentic cockpit forward vision through an optically flat artificial sapphire windshield, sharply raked to 70 degrees with ½ to 2 inch quintuple panes, arranged thinner to thicker front to back. Alternative rake to 80 degrees. Aft canopy opens in conventional manner. The preferred embodiment for earlier versions has a metaled canopy, as opposed to completely clear, to more easily achieve early pressure cell redundancy. Cockpit is provided with a full set of analog backup gauges around the periphery of the instrument panel CRT's and flat screens including turn-and-bank, altimeter, airspeed and Mach number, compass, artificial horizon, fuel on multi-position rocker switch, engine temps inside and at exhaust and oil pressure, warning lights with manual shutoffs for major systems, outside temperature and ILS needles. The multifunction displays show primary and secondary flight data, navigation by GPS, Tacan and VOR Omnirange and tactical and strategic awareness, combining localized N and X band radar with a NORAD uplink and direct satellite data to view the entire globe on-screen. The exemplary embodiment has on-screen targeting with interface to HUD and behind canopy fixed ring-and-bead sight for high EMF environment backup. The cockpit is setup to fly and land the aircraft with all the computers out through analog control. Conventional stick and rudder controls for their suitability to high speed flight with reaction control on top of stick and triggers below. Controls to deploy speedbrakes, spoilers and drag parachute by the throttle. Full spacesuit accommodation. High orbital missions into, or escape velocity missions through the Van Allen belts require special shielding. Cockpit uses the preferred embodiment of the previously described composite armor and a visually transparent canopy with diffusions of heavy and precious metals for EMF shielding. Pilot and crew can resort to hoods, cloaks, capes and blankets of aluminum, steel, copper, silver or gold reflective material backed by encased EMF absorbing lead plates around the pilot and crew as required. Higher GTW versions of the invention accommodate relief crewing for extended duration flight.

Crew escape is via either the ACES II or Martin Baker ejection seats because the invention is intended to enable reentry and exit to lower speed and altitude regimes with portions of wing or wings damaged or missing. Pilot and crew have access to bail out blankets that strap tight across chair for extra-envelope ejections to Mach 1.3 and 80,000 feet. Alternative rescue via spacewalk. A further alternative FIG. 34 is a triangular lifting body rescue vehicle based on the pressure vessel, nestled in the fuselage between the cockpit bulkheads 33, encompassing the canopy 34. and with popout canted tails 35. Equipped with a supply of electricity activating a minimum of gauges and powering the articulated popout tails, extended capacity bailout bottle type life support and active cooling. There is a weight tradeoff between retrofire and extra orbit-decaying dynamic soaring time. Can accommodate nose wheel and skids. Another alternative is cockpit separation at the aft bulkhead FIG. 35. Simple separation is best for emergency orbital spacewalk-on-orbit or post-reentry rescue only, due to reentry G's and heating. Self contained rescue requires balancing by heavy rear bulkhead or equippage, alternatively by simultaneous ejection of ceramic nosecone and equipping cockpit section to perform as an autonomous aerodynamic vehicle, with three popout tails, one vertical and two canted to either side, to maintain stability and control in this blunt a lifting body. Only the side tail elements require articulation. The equippage requirement and propulsion versus drag deceleration component is similar to that of the bulkhead cradled rescue vehicle above. Cockpit section is large enough to accommodate nosewheel and skids, alternatively simple tricycle, or simple crosswind quad landing gears with drag chute deceleration to assist no-choise deadstick touchdown. Both rescue vehicles also accommodate simple ejection recovery after exit to lower speed and altitude regimes.

The armament of the preferred embodiment consists of existing, modified and new weapons and satellites appropriate to detecting, destroying or deflecting asteroids from orbital or escape velocity or faster flight profiles, or to detecting and destroying orbital, air and ground targets from orbit, or from below orbit, in an atmospheric flight profile. Weapons are carried internally in dorsal weapons bays and in bays on the fuselage sides. Weapons are also carried on dorsal or ventral hardpoints to lower Mach numbers and, if purpose built, to higher Mach numbers. To assist bay separations at high atmospheric Mach numbers the weapons bay openings are conformal to the shape of the weapon being deployed, with a slight nose high and fast deployment away from the present invention. Weapons for space use may face to the back. Can also carry commercial and scientific payloads at a substantially reduced cost over present practice due to gains from high pressure TiAl forgings and extrusions together with atmospheric combustion on ascent and return flight. T-61 series or alternatively Mauser 27 mm follow-on aircraft cannon with small closing aperture, above left wing root. Provision to cool cannon and ammunition with slow rate fire suppression if aperture fails to close. Cannon placarded against use above Mach 5 and below 250,000 feet.

The equipment of the preferred embodiment has double to triple redundancy, with quintuple redundancy for CPU's. Double redundancy for the heavy and bulky installations—active cooling, reaction control, fire suppression and environmental control. Triple redundancy for 3000–5000 psi hydraulic and 24v electrical, navigation and communication systems. Alternative for electric double redundancy to save weight, utilizing two APU's. Alternative use of less redundancy saves weight but can tend to compromise flight safety in the rigorous flight envelope. Fire suppression via Halon alternatively $co2$, nitrogen or better with large capacity for slow rate fire suppression to accommodate damaged reentry. The invention utilizes an array of non-sticking valves to be able to shut of parts of or entire active cooling, fire suppression and hydraulic systems to preserve partial function and to keep perforated systems from running dry, alternative at the reservoirs and condensers as a minimum. Double redundant refrigeration for refrigerated liquid stowage, environmental and active cooling. Full radar, IR, optical, ELINT and communications arrays from nose, top fuselage and main wings, tails and sides of the present invention. Quintuple redundant computer CPU, bus and key circuits to redundant memory and storage. Major systems are sealed away and isolated, provided with redundant fire suppression and composite armor. Large battery capacity for long duration and high flight. Two APU embodiments can use thin wire gauge battery only third circuits.

The preferred embodiment begins cost containment by building X and Y prototypes. Hypersonic flight is a new art and questions of high Mach number fluid dynamic variables and atmospheric combustion altitude limits leave room in the art for error requiring forays similar to those of the F-102 and F-102A to perfect the art for production. Assembled to a full Douglas Aircraft assembly specification or better to contain expansion-contraction stress and vibration and increase useful life and reliability, reducing long term operating costs. Design and management teams sized on a Hawker-Camm American between-the-world-wars model of under 100 people with computer aid and equity participation. Team motivated and prepared to further reduce costs with wide national and international subcontracting on the secured General Dynamics F-16 distributed production management model. Costs are further reduced by stock and option equity participation of the production team, as with the design and management team described above, both by motivation to productivity increase and improvement in idea flow original to yeoman psychology of ownership. Similar equity participation is encouraged among the subcontractors to improve parts cost, while maintaining their return on investment. Improvement of the forgings and extrusions can reduce parts count and increase performance. Operational cost drops as the spaceplane ratio of structure to payload plus fuel approaches the Douglas Cloudster benchmark of 1:1. The process of this structural progression gives prospect of improving on the benchmark.

The mode of operation of the preferred embodiment reflects the improvement in materials by allowing true SSTO flight with atmospheric combustion and SSTO flight with solid rocket assist for liquid rocket combustion. The rocket spaceplane of the present invention is preloaded with payload, then fueled with propellant and oxidizer using a static ground and then rolled out, with attendants, and positioned at the end of a partially or fully dedicated runway. Alternatively, turbine powered taxi to end of operating runway. Along with the internal rocket, alternatively two, three or four rocket motors, the present invention is powered by solid rocket boosters ventrally mounted for ease of ground handling and avoiding sonic fatigue on vertical tail elements. The solid rockets are mounted under the fuselage centerline, or either side of the centerline, and under the wings. At full power brakes are released and after takeoff the pilot flies on as straight a line as possible, alternatively cutting out turbine power and closing the apertures after Mach 0.9–1.3 and up to the rocket propulsion cutoff point. The specified aerodynamics and materials of the present invention improve powered flight and post rocket cutout, burnout and release glide precision and performance up to the 40 to 50 mile high apogee. Higher payload destination requires IUS or payload materiel insertion into orbit. Pilot turns 180 degrees and returns on the reciprocal. Gear and flaps dropped for final on straight in approach. Dead stick landing. Alternatively, turbine power below Mach 0.9 to powered landing. Rocket spaceplane is recovered by the ground crew at the end of the rollout and returned to the hangar. Alternatively, turbine powered taxi to selected hardstand or hangar.

The jet spaceplane is loaded and fueled at the same time, with a static ground. After loading, the engines are started under turbine compression as described above under propulsion and the present invention taxis to the end of the operating runway and takes off under internal power. The flight profile is directed by the mission. Missions are interception, patrol, attack, reconnaissance, utility, cargo without deployment, cargo with deployment and scientific. Time sensitive conduct of all missions requiring full takeoff power alternatively with solid rocket assist on takeoff, in initial climb and away from populated areas is available.

The interception mission is conducted with full power takeoff followed by shortest azimuth to firing position and engagement of target. Following initial engagement with powered or unpowered hypersonic drones, other ordinance and gunfire, further drones are released to execute 24 G turns in chase while the invention executes 8.5 G turns also in pursuit. Surviving targets are consecutively engaged by interception until or after sub Mach 3 aircraft, ground based gunnery and missile fire, including area and point terminal missile-based defenses engage. Retrofire to deorbit with dynamic soaring return. Sorties, pairs and flights of the jet spaceplane then return to base or other convenient recovery area as limited by endurance or other military factors. Powered landing, braking with spoilers, speed brakes, drag parachute and carbon disc brakes followed by roll out. After rollout the jet spaceplane taxis under power to selected hardstand or hangar.

The patrol mission is conducted with power settings as low as 60% for takeoff followed by high subsonic climb on a course that intercepts the required ascent above 65–68,000 feet, clearing the ozone layer prior to application of full power. Alternatively full power takeoff as described above. Alternatively, suborbital to 45,000 feet, full power for climb to mission trajectory. Suborbital conducts patrol, or patrols to limit of endurance, and returns to base in similar manner to interception as described above. Orbital conducts patrol and returns in a similar manner.

The attack mission is conducted with full power or alternatively, partial power to 65,000 feet as described above. During attack powered and unpowered hypersonic drones or, alternatively, other ordinance is released depending on terminal altitude and speed over target.

The reconnaissance mission is conducted similarly to the attack mission above. Alternatively, by hypersonic drones launched in flight or from the ground.

The utility mission conveys a limited number of passengers, written dispatches and cargoes on high speed or suborbital arcs point to point. Alternatively into orbit, for transfer by docking. Alternatively, orbital, for transfer by placement into orbit. Alternatively, positioning in orbit for IUS placement in a higher orbit. Alternatively, high orbital for high orbital placement requiring special cloaking of crew as described above under accommodation. Alternatively, orbital recovery of cargoes on orbit. Alternatively, orbital recovery of passengers, written dispatches and cargoes by docking. Alternatively, signal relay.

The science mission supplies the ISS, and conducts other orbital research in free flight. Alternatively, at the top of the GTW range of the present invention, the science mission is conducted at escape velocity to the limits of endurance.

Table 1 shows estimates of the rocket spaceplane of the present invention by weight, ceiling and payload utilizing TiAl materials of the maximum press weights specified and alternative propulsion as described above.

| GTW | Ceiling | Payload |
| --- | --- | --- |
| 100,000 | 40 miles | 150 lbs. |
| 200,000 | 50 miles | 300 lbs. |
| 300,000 | 50 miles | 500 lbs. |

Table 2 shows estimates of the jet spaceplane of the present invention by size, GTW and performance of speed, payload and endurance, utilizing TiAl materials at 80% of the maximum press weights specified above.

| Dimensions: | |
| --- | --- |
| Span: | –35–150+ feet |
| Length: | –50–200+ feet |
| Height: | –25–60+ feet |

| Weights: | |
| --- | --- |
| 50–120,000 lbs. | Suborbital, Orbital with Solid Rocket Assist |
| 120–200,000 lbs. | To Orbital, Escape Velocity with SRA |
| 200–300,000 lbs. | Orbital, Escape Velocity with/without SRA |

| Performance: | | | |
| --- | --- | --- | --- |
| | Speed | Payload | Endurance |
| 50–120,000 lbs. | up to Mach 24+ | to 10,000+ lbs. | 2 hours to 1 day |
| 120–200,000 lbs. | up to Mach 33+ | to 20,000+ lbs. | 1 day to 1 week |
| 200–300,000 lbs. | up to Mach 33+ | to 30,000+ lbs. | 1 week to 2 weeks |

I claim:

1. A space plane, comprising;

A fuselage with an outer skin and an inner structure that supports the outer skin, where the outer skin and inner structure are formed from titanium aluminide and where the fuselage comprises a lifting body;

A front aspect fuselage width from 1.1 to 1.5 times a front aspect fuselage height;

A pair of main wings, respectively attached to opposed sides of the fuselage;

A pair of canards, respectively attached to opposed sides of the fuselage and located forward of the main wings;

A ceramic nose cone attached to a forward portion of the fuselage and which comprises passages within the ceramic for active cooling;

An active cooling system which comprises cooling lines to cool the fuselage, outer skin, and nose cone;

Titanium aluminide extrusions on the inner side of said outer skin which act as heat sinks to transfer heat to said cooling lines and to hold said cooling lines in place;

Carbon/carbon ablative shields positioned within the space plane to provide internal structures with protection against heat in the event of outer skin or active cooling system failure;

A fire suppression system;

A vertical tail plane positioned on a rear portion of the fuselage;

A landing gear comprising a nose wheel and at least two multi-wheel bogies;

A propulsion system comprising an engine capable of propelling the space plane at a speed of at least Mach 3.5; and whereby the space plane is capable of operation both inside and outside an atmosphere.

2. A space plane as in claim 1;
wherein said engine comprises a scram jet.

3. A space plane as in claim 1;
further comprising an ablative cockpit firewall that is canted relative to a longitudinal axis of the space plane and which is actively cooled so as to support aerodynamic flight without said nose cone.

4. A space plane as in claim 1;
further comprising a cockpit with a windscreen, where said windscreen comprises quintuple panes that are arranged in line from a forward position to a rearward position and where each pane is thicker than the pane immediately forward of its position.

5. A space plane as in claim 1;
further comprising a weapons bay.

* * * * *